Patented Aug. 14, 1945

2,381,972

UNITED STATES PATENT OFFICE 2,381,972

PRODUCTION OF ETHYL CELLULOSE

Henry Dreyfus, London, England

No Drawing. Application December 16, 1942, Serial No. 469,223. In Great Britain January 2, 1942

1 Claim. (Cl. 260—231)

This invention is concerned with improvements in the production of cellulose ethers particularly ethyl cellulose.

The usual method for the production of cellulose ethers consists in etherifying cellulose in the presence of sodium hydroxide with the organic halide or sulphate corresponding with the ether which it is desired to produce. This method, however, while giving fairly satisfactory results in the production of ethers which are soluble in alkali or water is not so satisfactory when it is desired to produce ethers which are soluble in organic solvents, particularly ethers of this character which have a high viscosity. This is especially the case when the etherifying agent used is a dialkyl sulphate which from certain points of view, for example on account of its lower volatility, is preferable to the corresponding alkyl chloride.

According to the present invention cellulose ethers are produced by carrying out etherification in the presence of an inorganic base and of an organic base. The organic bases which are particularly valuable are aliphatic bases containing at least two tertiary amino groups, especially tetraethylethylene diamine and similar compounds such as tetramethylethylene diamine, tetraethyl-trimethylene diamine and tetramethyl-tetramethylene diamine. Primary or secondary organic bases, e. g., ethylene or propylene diamine, may be employed but since they are converted to tertiary bases during the reaction, with a corresponding consumption of etherifying agent, it is usually preferable to use a tertiary base ab initio.

The process is of particular importance when the etherifying agent employed is an alkyl sulphate, e. g., diethyl sulphate, since it renders possible the production of ethers having better viscosities than when etherification is effected under similar conditions using an inorganic base as the sole alkaline reagent.

The process of the present invention is particularly valuable for the production of ethyl cellulose and other lower alkyl ethers of cellulose which are soluble in organic solvents, e. g., aromatic hydrocarbons and mixtures thereof with alcohols.

The inorganic base employed is preferably sodium hydroxide and in general the molecular ratio of base to cellulose employed, based on the $C_6H_{10}O_5$ unit of cellulose, should be between 4 and 10:1. It is desirable that the amount of water present in the alkali-cellulose at the beginning of the etherification process should be restricted to an amount such that the alkali/water ratio is high. Amounts corresponding with aqueous alkali solutions containing at least 60%, e. g., 70% or more, of alkali and 40 or 30% or less of water may for example be employed. Alkali-cellulose containing such proportions of alkali and water may be produced, for example, by using alkali of the required concentration to impregnate the cellulose and then pressing out until the required proportion of alkali is present or it may be produced by impregnating cellulose with a dilute aqueous alkali solution, e. g., one having a concentration of 20–25%, pressing out the cellulose until the required proportion of alkali to cellulose is present and then concentrating the alkali solution on the cellulose by azeotropic distillation in the presence of nitrogen or other inert gas. Such a process is described in U. S. application No. 425,782, filed January 6, 1942, to which reference is made in this connection.

After the preparation of the alkali cellulose it may be mixed with the required amount of organic base and etherifying agent and etherification carried out in the usual manner. The amount of organic base may for instance be of the order of 20, 50 or 100% of the weight of the cellulose. When the alkali has been concentrated by azeotropic distillation as described above the alkali cellulose may be obtained in suspension in toluene or other suitable inert diluent, and in this case it is only necessary to add the required amounts of organic base and etherifying agent together, if necessary, with any additional quantity of diluent which may be necessary, and proceed with the etherification. As stated above, the present process is particularly valuable when the etherifying agent employed is a dialkyl sulphate and in this case it is usually desirable to have an inert diluent present in such quantity that the etherification mixture can be easily stirred so as to promote uniform etherification. When an alkyl halide is employed the inert diluent may be dispensed with and the alkyl halide itself used in a large excess so that it acts both as diluent and as etherifying agent.

The inert diluent, if employed, may be a water-miscible liquid such as dioxane or acetone, or a water-immiscible liquid, e. g. toluene or a xylene.

From the industrial point of view it is very important that the etherification process employed should yield a substantially uniform product and not, for instance, a product consisting of ethers of widely different ether content or solubility properties. As described in U. S. Patent No.

2,362,900, it has been discovered that uniformity is improved by carrying out the etherification in a series of stages, a proportion of the total alkali and etherifying agent being added at each stage. This method may with advantage be employed in carrying out the process of the present invention. The organic base may either be added at the beginning of etherification or in portions at each stage.

The following is an example of the production of ethyl cellulose by the process of the present invention:

Example

An alkali-cellulose is prepared by immersing cellulose in a 60% aqueous solution of sodium hydroxide and pressing the impregnated cellulose until the amount of solution remaining contains a quantity of sodium hydroxide corresponding with a molecular ratio of sodium hydroxide to cellulose of 4:1. It is then introduced into a vessel containing toluene, the ratio by weight of toluene to cellulose being about 10:1. Two molecular proportions of diethylsulphate based on the cellulose and an amount of tetraethyl-ethylene diamine equal to about 40% of the weight of the cellulose are then introduced and etherification effected for about 4 hours at the boiling point of the toluene. Four molecular proportions of sodium hydroxide in the form of a 70% aqueous solution are then introduced, the mixture well stirred for about 30 minutes to distribute the alkali uniformly and then two molecular proportions of diethylsulphate are introduced and etherification effected for a further four hours at the boiling point. Four more molecular proportions of sodium hydroxide and two more molecular proportions of diethylsulphate are then introduced and reacted in a similar manner. The ethyl cellulose produced is then separated and purified in the usual manner.

Having described my invention what I desire to secure by Letters Patent is:

Process for the production of cellulose ethers, which comprises etherifying cellulosic materials with di-ethyl sulphate in the presence of sodium hydroxide, and also of at least 40% of tetra-ethyl ethylene diamine, calculated on the weight of the cellulosic materials.

HENRY DREYFUS.